(12) United States Patent
Singh

(10) Patent No.: US 10,945,563 B2
(45) Date of Patent: Mar. 16, 2021

(54) CUTTING BOARD TRAY

(71) Applicant: Ravi Singh, Orlando, FL (US)

(72) Inventor: Ravi Singh, Orlando, FL (US)

( * ) Notice: Subject to any disclaimer, the term of this patent is extended or adjusted under 35 U.S.C. 154(b) by 0 days.

(21) Appl. No.: 15/417,519

(22) Filed: Jan. 27, 2017

(65) Prior Publication Data
US 2017/0265688 A1    Sep. 21, 2017

Related U.S. Application Data

(60) Provisional application No. 62/311,176, filed on Mar. 21, 2016.

(51) Int. Cl.
*A47J 47/16* (2006.01)
*A47J 47/00* (2006.01)

(52) U.S. Cl.
CPC .............. *A47J 47/16* (2013.01); *A47J 47/005* (2013.01)

(58) Field of Classification Search
CPC ................................ A47J 47/16; A47J 47/005
USPC .................... 269/289 R, 13, 14, 15; 206/553
See application file for complete search history.

(56) References Cited

U.S. PATENT DOCUMENTS

| | | | | |
|---|---|---|---|---|
| 1,130,234 A | * | 3/1915 | Wrobel | A47J 37/10 99/422 |
| D137,950 S | * | 5/1944 | Howard | D19/92 |
| D261,090 S | * | 10/1981 | Kapolas | D7/407 |
| D363,196 S | * | 10/1995 | Kristiansen | D7/553.3 |
| D492,884 S | * | 7/2004 | Swope | D7/505 |
| 7,322,573 B1 | * | 1/2008 | Edmond | A47J 47/005 269/289 R |
| 7,441,659 B2 | * | 10/2008 | Nelson | A47G 21/14 206/553 |
| 7,442,118 B2 | * | 10/2008 | Edmond | A47J 47/005 452/196 |
| 8,122,800 B2 | * | 2/2012 | Correa | A47J 47/005 220/507 |
| 8,770,562 B1 | * | 7/2014 | Blum | A47J 47/005 269/13 |
| 9,155,427 B1 | * | 10/2015 | Kumar | A47J 47/005 |
| 2005/0266125 A1 | * | 12/2005 | Robledo | B65B 67/04 426/115 |
| 2007/0251855 A1 | * | 11/2007 | Curnow | A61B 50/30 206/586 |
| 2013/0214466 A1 | * | 8/2013 | Young | A47J 47/005 269/14 |
| 2014/0138271 A1 | * | 5/2014 | Grinwald | B65D 81/054 206/386 |

* cited by examiner

*Primary Examiner* — Lee D Wilson
*Assistant Examiner* — Seahee Hong
(74) *Attorney, Agent, or Firm* — Alston & Bird LLP

(57) ABSTRACT

Various embodiments are directed to a cutting board tray for capturing foodstuffs removed from the cutting board. The cutting board tray comprises a a planar base portion configured to be positioned between a bottom surface of a cutting board and a support surface on which both the cutting board and tray are positioned; at least one raised edge extending perpendicular from the base portion; and at least one open edge. In various embodiments, the planar base portion is sufficiently thin that the cutting board remains stable when a contact portion of the bottom surface of the cutting board is positioned on the base portion.

10 Claims, 4 Drawing Sheets

CUTTING BOARD TRAY

CROSS-REFERENCE TO RELATED APPLICATIONS

This patent application claims priority from Provisional Application Ser. No. 62/311,176, filed Mar. 21, 2016, which is incorporated herein by reference in its entirety.

BACKGROUND

Food preparation often includes cutting, chopping, dicing, and/or the like food items into smaller pieces while the food items are on a cutting board. However, previously cut food items may take up space on a working surface of the cutting board thereby limiting the useable size of the working surface of the cutting board while the user continues to cut food items. Thus, users may remove previously cut food items from the working surface of the cutting board, and may place these previously cut food items within separate receptacles while the user continues to cut other food items.

However, moving cut items from the working surface of a cutting board to a separate storage receptacle historically requires lifting the food items off of the surface of the cutting board and into the receptacle, or requires a cutting board to be raised and having a separate tray located under the raised cutting board working surface. Accordingly, a need exists for a tray to facilitate the transfer of food items from a working surface of a cutting board to the tray.

BRIEF SUMMARY

Various embodiments are directed to a cutting board tray for capturing foodstuffs swept off of the surface of a cutting board. In certain embodiments, the cutting board tray comprises a planar base portion configured to be positioned between a support surface and a contact portion of a bottom surface of a cutting board configured to rest directly on the support surface; at least one raised edge extending perpendicular from the planar base portion; and at least one open edge. In certain embodiments, the planar base portion is sufficiently thin that the cutting board remains stable when a contact portion of the bottom surface of the cutting board is positioned on the base portion.

Moreover, in various embodiments, the planar base portion is rigid. The planar base portion may have a thickness less than 2 mm. In certain embodiments, the planar base portion has a rectangular shape.

In certain embodiments, the cutting board tray comprises at least two raised edges extending perpendicular from adjacent edges of the planar base portion. In various embodiments, the cutting board tray additionally comprises at least two open edges positioned opposite the two raised edges relative to the planar base portion.

Moreover, in various embodiments, the cutting board tray comprises a knife holder.

Various embodiments are directed to a method for using a cutting board tray, wherein the cutting board tray comprises: a planar base portion, at least one raised edge extending perpendicular from the planar base portion, and at least one open edge, the method comprising steps for: placing the planar base portion of the cutting board tray between a support surface and a contact portion of a bottom surface of a cutting board such that at least a portion of the open edges are positioned between the support surface and the bottom surface of the cutting board, the at least one raised edge is positioned adjacent a side edge of the cutting board, and at least a portion of the support surface remains exposed adjacent the cutting board; and moving food items off of the cutting board and onto the exposed portion of the cutting board tray.

BRIEF DESCRIPTION OF THE SEVERAL VIEWS OF THE DRAWINGS

Reference will now be made to the accompanying drawings, which are not necessarily drawn to scale, and wherein.

DETAILED DESCRIPTION

The present invention will now be described more fully hereinafter with reference to the accompanying drawings, in which some, but not all embodiments of the invention are shown. Indeed, the invention may be embodied in many different forms and should not be construed as limited to the embodiments set forth herein. Rather, these embodiments are provided so that this disclosure will satisfy applicable legal requirements. Like numbers refer to like elements throughout.

Various embodiments are directed to a cutting board tray configured to provide a receptacle for holding food items that have been removed from a working surface of a cutting board. A portion of the cutting board tray is configured to fit below a cutting board (between the cutting board and a support surface under the cutting board), and a portion of the cutting board tray remains adjacent the cutting board, such that food items pushed off of the working surface of the cutting board tray and toward the cutting board tray fall onto an exposed portion of the cutting board tray adjacent the cutting board. The cutting board tray may have one or more raised side edges configured to contain food items on the cutting board tray. In various embodiments, the cutting board tray may be moved toward the cutting board (e.g., such that a larger portion of the cutting board tray is below the cutting board) and/or away from the cutting board (e.g., such that a larger portion of the cutting board tray is exposed adjacent to the cutting board).

Figure 1:
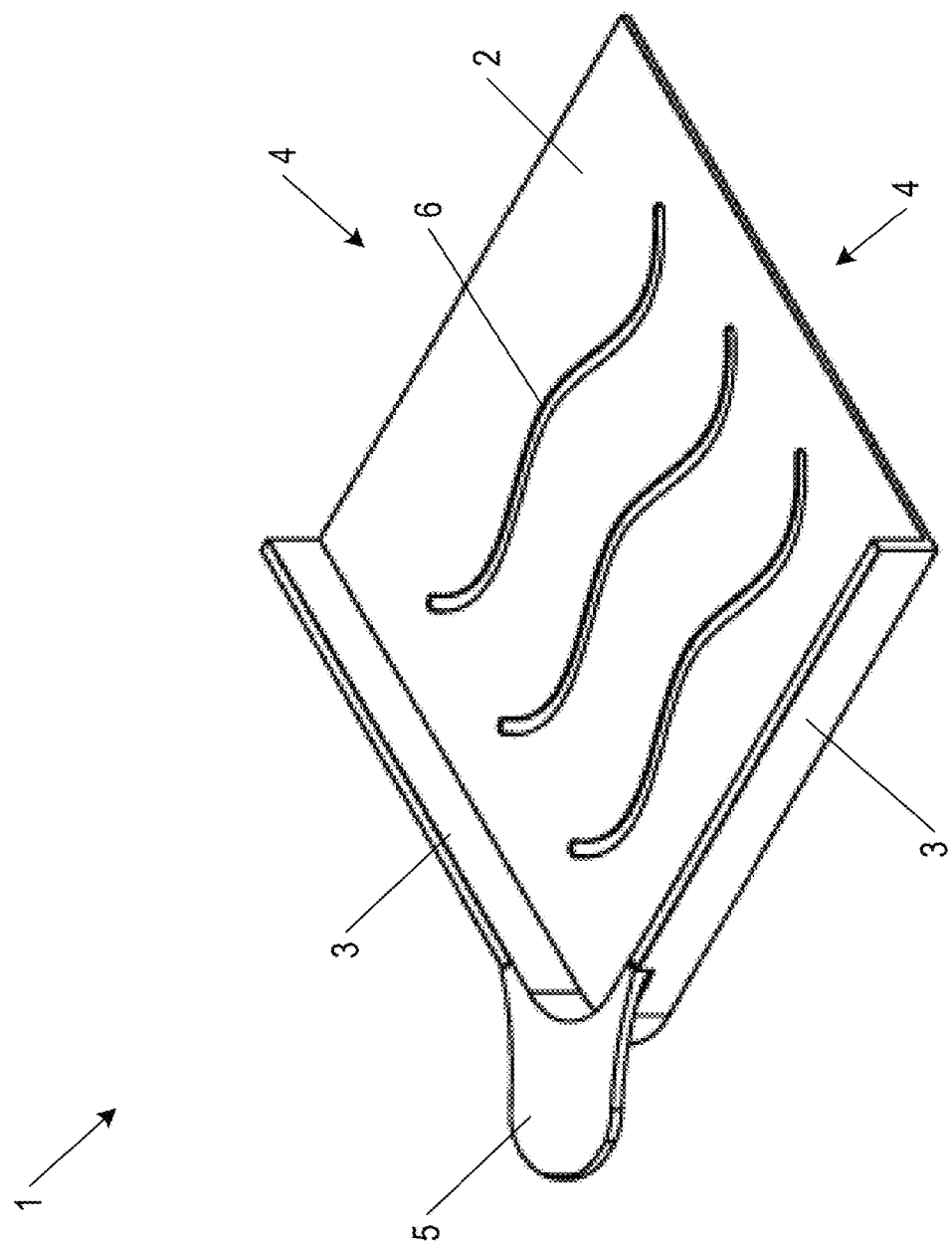
FIG. 1 shows a cutting board tray according to one embodiment.
Figure 2:
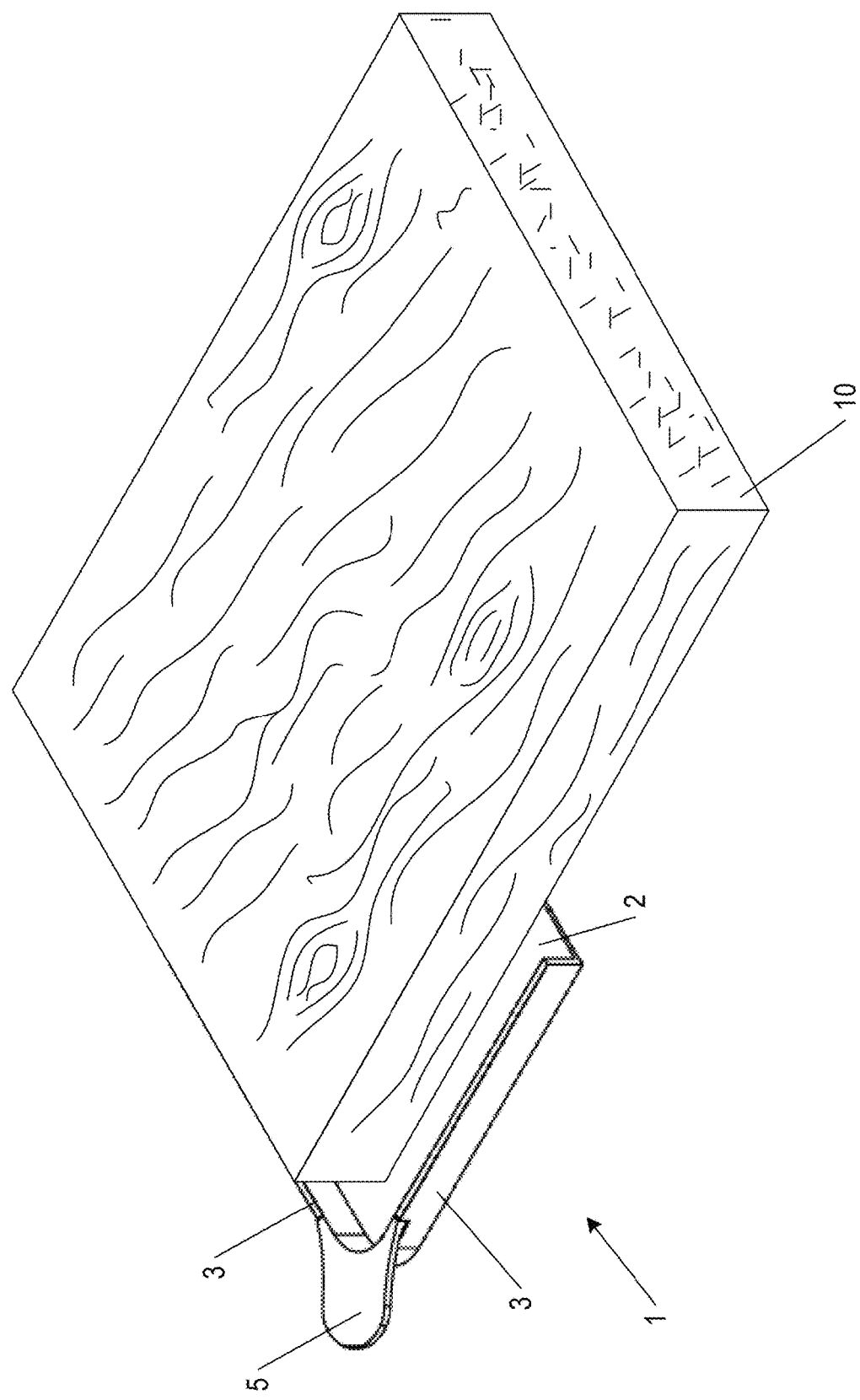
FIG. 2 shows a cutting board tray in use with a cutting board according to one embodiment.

As shown in FIG. 1, which is a schematic diagram of a cutting board tray according to various embodiments, the cutting board tray 1 may comprise a thin base portion 2 configured to fit under a portion of a cutting board 10 (shown in FIG. 2) without de-stabilizing the cutting board 10 (e.g., such that the cutting board 10 does not wobble due to a portion of the cutting board 10 being raised above other portions of the cutting board 10 relative to the support surface). In various embodiments, the base portion 2 is configured to be positioned between a support surface and a contact portion of the cutting board 10 configured to rest directly on a support surface (e.g., a support foot of the cutting board 10 configured to rest on a support surface and thereby support the cutting board 10 above the support surface), as shown in FIG. 2. For example, the base portion 2 may be configured to rest under a single support foot of a cutting board 10 (e.g., proximate a corner of the cutting board), while the remaining support feet of the cutting board 10 remain directly in contact with the support surface.

The base portion 2 may have an at least substantially uniform thickness that is sufficiently thin such that the cutting board 10 is not destabilized while the base portion 2 is positioned between the support surface and the contact portion of the cutting board 10. For example, the base portion may be less than 3 mm in thickness, more preferably less than 2 mm in thickness, and even more preferably less than 1 mm in thickness. As shown in FIG. 1, the base portion 2 may define one or more engagement members 6 configured to impede unintended movement of the cutting board tray 1 relative to the cutting board 10 and/or the support surface. The engagement members 6 may comprise high-friction surfaces extending proud of the base portion 2 (e.g., upward toward a bottom surface of a cutting board 10 when engaged therewith, and/or downward toward a support surface when placed thereon). Moreover, although not shown, the base portion 2 may define an inset portion configured to contain liquids within the cutting board tray 1 (e.g., liquids excreted by food items placed within the cutting board tray 1).

Moreover, the cutting board tray 1 may comprise one or more raised edges 3 extending upwardly away from the base portion 2. The raised edges 3 may be configured to contain food items on the cutting board tray 1. The raised edges 3 may have a thickness greater than the thickness of the base portion 2. For example, the raised edges 3 may have a thickness of 2 mm, 3 mm, 4 mm and/or the like.

Moreover, as shown in FIG. 1, the cutting board tray 1 has one or more open sides 4, defined by an edge of the base portion 2 without a corresponding raised edge 3. Thus, the raised edges 3 may not extend around the entire perimeter of the base portion 2, such that at least a portion of the base portion 2 (including the one or more open edges 4 of the base portion 2) may be placed under a cutting board 10 while the raised edges 3 remain adjacent to sides of the cutting board 10. Accordingly, as shown in FIG. 1, the open edges 4 may be opposite the raised edges 3. As shown in FIG. 1, the raised edges 3 may define an at least substantially 90 degree corner, such that the raised edges 3 may fit against a vertical corner of a cutting board 10 while at least a portion of the base portion 2 of the cutting board tray 1 is under the cutting board 10. However, any of a variety of shapes may be implemented.

As shown in FIG. 1, various embodiments additionally comprise one or more handles 5. The one or more handles 5 may comprise a protrusion extending away from one or more of the raised edges 3 in a direction away from the base portion 2. The protrusion may extend substantially parallel to the base portion 2, however the protrusion may extend away from the one or more raised edges 3 in any of a variety of directions (e.g., 45 degrees relative to the base portion and/or the raised edges). Moreover, in various embodiments, the handle 5 may define a hole to facilitate handing the handle 5 relative to a support (e.g., a fastener protruding from a wall).

In various embodiments, the cutting board tray 1 may comprise a resilient material (e.g., rubber, silicone, and/or the like) such that the cutting board tray 1 is flexible. Moreover, the resilient material may have a high coefficient of friction to facilitate frictional engagement between the cutting board tray 1 and a support surface and between the cutting board tray 1 and the cutting board 10. Moreover, in various embodiments the cutting board tray 1 and/or a resilient material of the cutting board tray 1 may be colored to provide an indication of a purpose of the cutting board tray 1. As a non-limiting example, certain cutting board trays 1 may be green (and/or have green accents) in order to indicate that the tray is used for vegetables. As yet another non-limiting example, a cutting board tray 1 may be red (and/or have red accents) in order to indicate the tray is used for meats.

In various embodiments, the cutting board tray 1 may comprise a rigid material (e.g., a rigid plastic, a rigid metal, wood, and/or the like). In various embodiments, at least a portion of the rigid material may have a resilient and/or high-friction coating. For example, the one or more engagement members 6 may comprise a resilient and/or high friction material.

Moreover, with reference again to FIG. 1, the base portion 2 may have a substantially rectangular shape (e.g., square) having two raised edges 3 along adjacent edges of the rectangle and two open edges 4 along adjacent edges of the rectangle opposite the two raised edges 3. However, the base portion 2 may have any of a variety of shapes such that the open edges 4 of the base portion 2 are opposite the raised edges 3 such that a portion of the base portion 2 may be positioned under a cutting board 10 while the raised edges 3 remain adjacent the cutting board 10. For example, the base portion 2 may comprise a circular and/or elliptical shape, such that the raised edges 3 define a segment of the base portion. For example, the raised edges 3 may define a hemisphere, less than a hemispherical segment of the edge of the base portion 10, or larger than a hemispherical segment of the edge portion 10. As yet another example, the base portion 2 may comprise a triangular shape having two raised edges 3 along adjacent sides and having a third, open side. Other complex shapes may be implemented, such as a cutting board tray 1 having raised edges 3 arranged in a 90 degree corner, and having an enlarged bulbous-shaped corner (e.g., the corner having a radius greater than a distance between the adjacent raised edges 3) surrounded by additional raised edges 3. In such embodiment, a portion of the base portion 2 (e.g., within the bulbous-shaped corner) remains exposed and adjacent the cutting board 10 even while the raised edges 3 are in contact with vertical edges of a rectangular cutting board 10.

In various embodiments, the cutting board tray 1 is configured such that the raised edges 3 may be moved toward or away from a cutting board 10 while the base portion 2 remains at least partially under the cutting board 10, such that the exposed portion of the base portion 2 adjacent the cutting board 10 may be varied. Accordingly, the cutting board tray 1 may provide a variable sized region in which food items may be placed, adjacent the cutting board 10.

Figure 3:
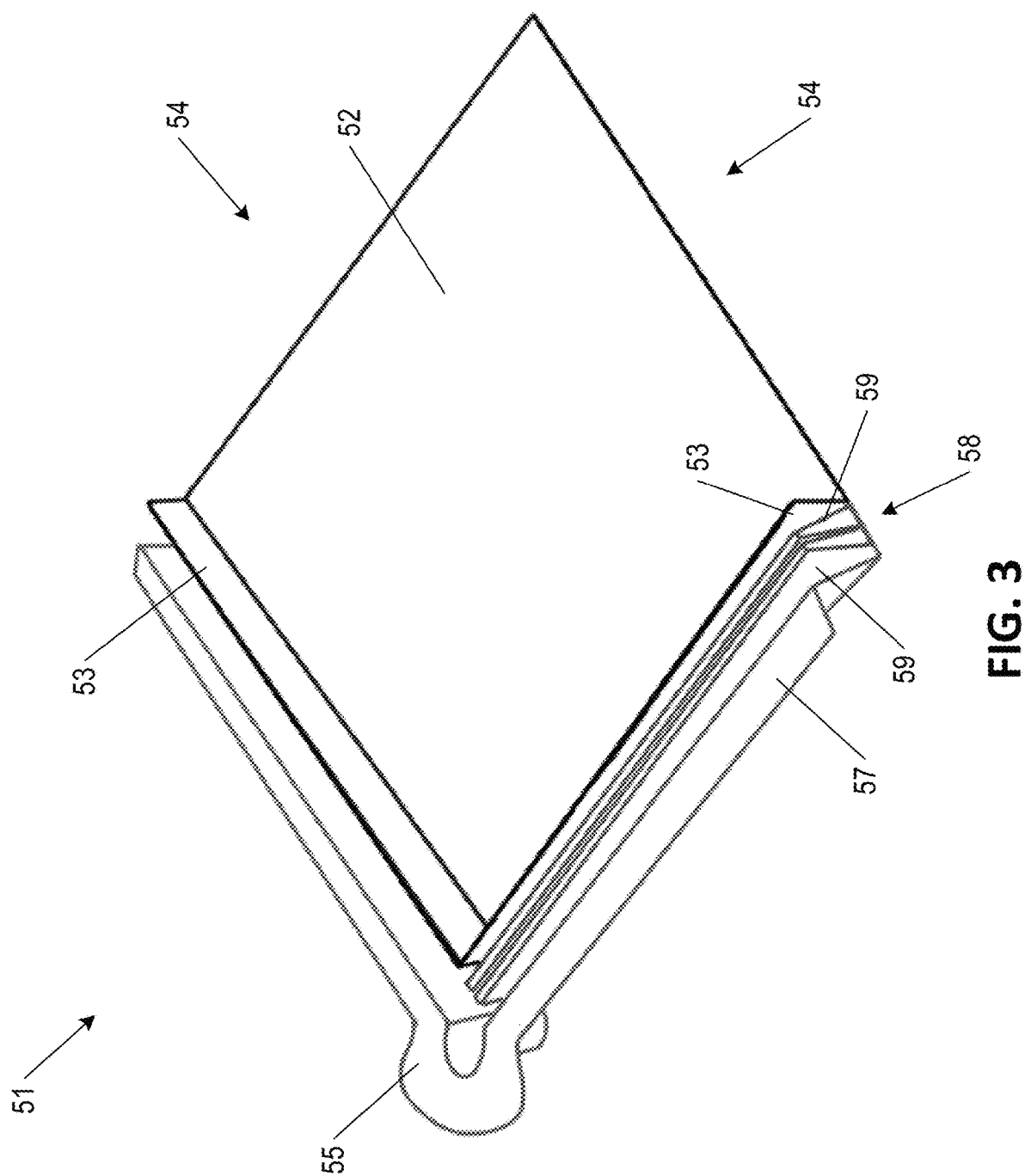
FIG. 3 shows a cutting board tray according to another embodiment.

As shown in FIG. 3, which illustrates another embodiment of a cutting board tray, the cutting board tray 51 may additionally include a knife holder according to various embodiments. Like the cutting board tray 1 shown in FIGS. 1 and 2, the cutting board tray 51 may comprise a thin base portion 52 configured to fit under a portion of a cutting board without de-stabilizing the cutting board (e.g., such that the cutting board does not wobble due to a portion of the cutting board being raised above other portions of the cutting board relative to the support surface). The base portion 52 may have an at least substantially uniform thickness that is sufficiently thin such that the cutting board is not destabilized while the base portion 52 is positioned between the support surface and the contact portion of the cutting board. For example, the base portion may be less than 3 mm in thickness, more preferably less than 2 mm in thickness, and even more preferably less than 1 mm in thickness. Moreover, although not shown, the base portion 52 may define one or more engagement members (like engagement members 6) configured to impede unintended movement of the cutting board tray 51 relative to the cutting board and/or the support surface. The engagement members may comprise high-friction surfaces extending proud of the base portion 52 (e.g., upward toward a bottom surface of a cutting board when engaged therewith, and/or downward toward a support surface when placed thereon). Moreover, although not shown, the base portion 52 may define an inset portion configured to contain liquids within the cutting board tray 51 (e.g., liquids excreted by food items placed within the cutting board tray 51).

Moreover, the cutting board tray 51 may comprise one or more raised edges 53 extending upwardly away from the base portion 52. The raised edges 53 may be configured to contain food items on the cutting board tray 51. The raised edges 53 may have a thickness greater than the thickness of the base portion 52. For example, the raised edges 53 may have a thickness of 2 mm, 3 mm, 4 mm and/or the like.

Moreover, as shown in FIG. 3, the cutting board tray 51 has one or more open sides 54, defined by an edge of the base portion 52 without a corresponding raised edge 53. Thus, the raised edges 53 may not extend around the entire perimeter of the base portion 52, such that at least a portion of the base portion 52 (including the one or more open edges 54 of the base portion 52) may be placed under a cutting board while the raised edges 53 remain adjacent to sides of the cutting board.

Figure 4:
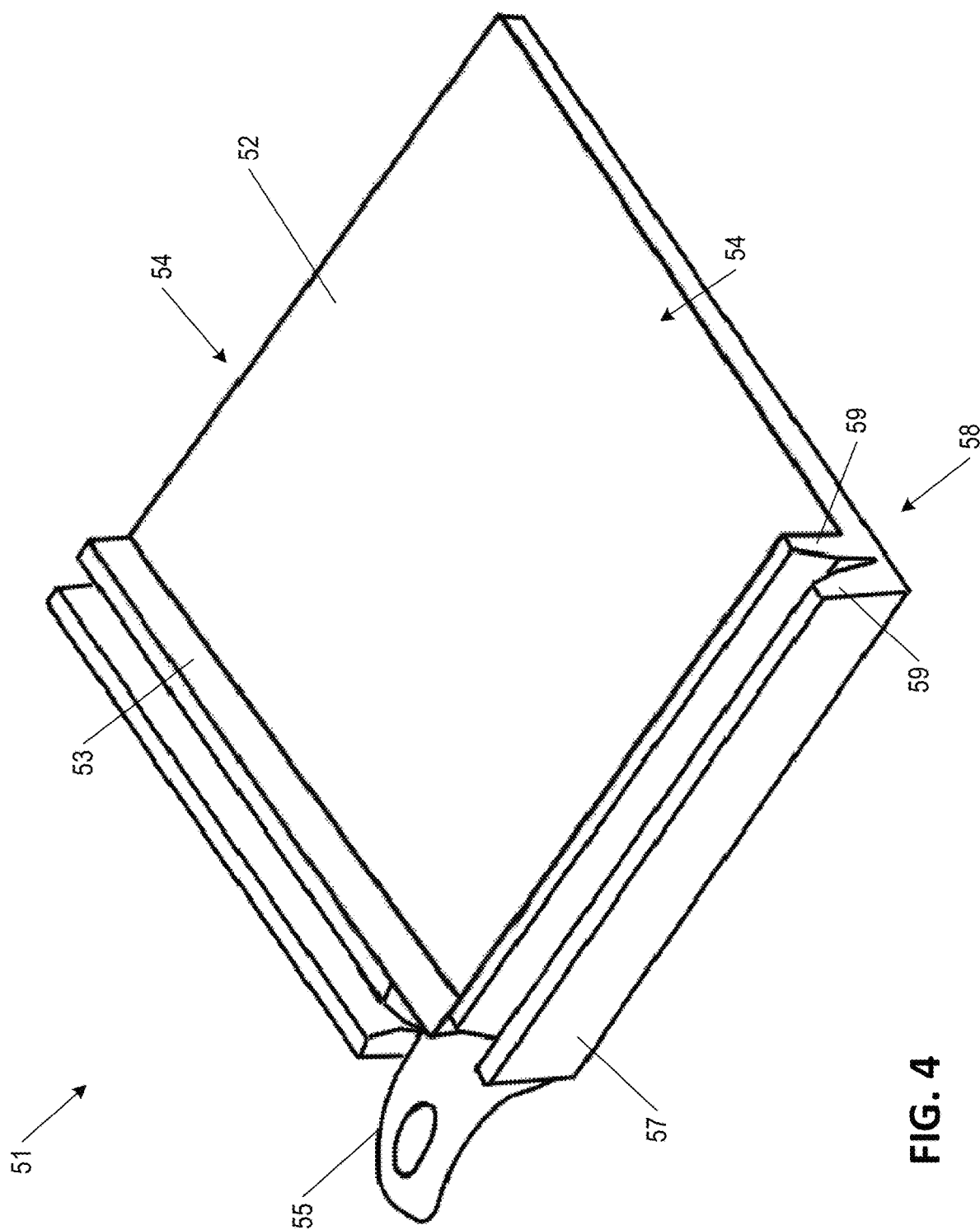
FIG. 4 shows a cutting board tray according to another embodiment.

As shown in FIG. 3, the raised edges 53 may be spaced apart from, and are on an interior of an outer wall 57. The outer wall 57 may additionally define one or more handles 55 similar to the handle 5 shown and discussed in reference to FIGS. 1 and 2. Moreover, between the outer wall 57 and the raised edges 53, the cutting board tray 51 may additionally comprise a knife holder 58. The knife holder may be oriented for right-handed individuals (e.g., such that the knife holder 58 is on a right side of a cutting board) and/or for left-handed individuals (e.g., such that the knife holder 58 is on a left side of a cutting board). The knife holder 58 may comprise two at least substantially parallel knife walls 59, having a space therebetween for accepting a knife blade, while maintaining a vertical orientation of the knife blade. For example, the two at least substantially parallel knife walls 59 may be in contact, and may be configured to flex apart when a knife blade is placed therebetween. In various embodiments, the knife walls 59 may comprise a plastic material, a metal material, a wood material, and/or the like. Moreover, in various embodiments, the knife walls 59 may comprise a resilient material, and/or may be coated with a resilient material (e.g., silicone) to provide a frictional engagement between the knife and the knife walls 59. Such frictional engagement may impede unintentional removal of the knife from the knife holder 58. Moreover, although the knife holder 58 is shown between the raised edges 53 and outer walls 57, it should be understood that in various embodiments, the knife holder may form a portion of the raised edges 53 and/or the outer walls 57 (e.g., as shown in FIG. 4).

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A cutting board tray comprising:
   a planar base portion configured to be positioned between a support surface and a contact portion of a bottom surface of a cutting board configured to rest directly on the support surface, wherein the planar base portion comprises a rigid material and one or more engagement members coated onto a portion of the planar base portion, wherein each of the one or more engagement members comprise a resilient material and wherein the planar base portion defines a perimeter having a plurality of edges;
   at least two raised edges extending perpendicular from the planar base portion along at least two adjacent edges of the plurality of edges of the perimeter of the planar base portion;
   a handle extending away from a corner between two of the at least two raised edges; and
   at least two open edges positioned opposite the at least two raised edges relative to the planar base portion;
   wherein the planar base portion, comprising the rigid material and the one or more engagement members coated onto a portion of the planar base portion, has an overall thickness less than 3 mm.

2. The cutting board tray of claim 1, wherein the thickness of the planar base portion is less than 2 mm.

3. The cutting board tray of claim 1, wherein the planar base portion has a rectangular shape.

4. The cutting board tray of claim 1, further comprising a knife holder.

5. The cutting board tray of claim 1, wherein the planar base portion is rigid and wherein the one or more engagement members are disposed on a top surface of the planar base portion.

6. The cutting board tray of claim 1, wherein the planar base portion is resilient and wherein the one or more engagement members are disposed on a top surface of the planar base portion.

7. The cutting board tray of claim 1, wherein the resilient material comprises silicone.

8. The cutting board tray of claim 2, wherein the thickness of the planar base portion is less than 1 mm.

9. The cutting board tray of claim 1, wherein the at least two raised edges have a thickness greater than the thickness of the planar base portion.

10. A method for using a cutting board tray, wherein the cutting board tray comprises: a planar base portion defining a perimeter having a plurality of edges and comprising a rigid material and one or more engagement members coated onto a portion of the planar base portion, wherein each of the one or more engagement members comprise a resilient material, at least two raised edges extending perpendicular from the planar base portion along at least two adjacent edges of the plurality of edges of the perimeter of the planar base portion, a handle extending away from a corner between two of the at least two raised edges, and at least two open edges positioned opposite the at least two raised edges relative to the planar base portion, the method comprising steps for:
   placing a portion of the planar base portion including at least a portion of the one or more engagement members of the cutting board tray between a support surface and a contact portion of a bottom surface of a cutting board such that at least a portion of the open edges are positioned between the support surface and the bottom surface of the cutting board, the at least two raised edges are positioned adjacent a side edge of the cutting board, and at least a portion of the support surface remains exposed adjacent the cutting board; and moving food items off of the cutting board and onto the portion of the support surface that remains exposed adjacent the cutting board.

\* \* \* \* \*